United States Patent
Wright

(10) Patent No.: US 6,267,381 B1
(45) Date of Patent: Jul. 31, 2001

(54) RESILIENT STRIP SEAL ARRANGEMENT

(75) Inventor: Christopher Wright, Bristol (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/228,274

(22) Filed: Jan. 11, 1999

(51) Int. Cl.$^7$ ................................................. F16J 15/447
(52) U.S. Cl. ............................................................ 277/355
(58) Field of Search ..................................... 277/355, 411

(56) References Cited

U.S. PATENT DOCUMENTS

| | | | |
|---|---|---|---|
| 885,032 | * | 4/1908 | De Ferranti . |
| 4,526,509 | * | 7/1985 | Gay, Jr. et al. . |
| 5,031,922 | | 7/1991 | Heydrich . |
| 5,071,138 | | 12/1991 | MacKay . |
| 5,108,116 | | 4/1992 | Johnson . |
| 5,174,582 | * | 12/1992 | Ferguson et al. . |
| 5,568,931 | * | 10/1996 | Tseng et al. . |
| 5,884,918 | * | 3/1999 | Basu et al. . |
| 5,941,685 | * | 8/1999 | Bagepalli et al. . |
| 5,944,320 | * | 8/1999 | Werner et al. . |
| 5,997,004 | * | 12/1999 | Braun et al. . |
| 6,032,959 | * | 3/2000 | Carter . |

FOREIGN PATENT DOCUMENTS

| | | |
|---|---|---|
| 0391676 | 10/1990 | (EP) . |
| 2021209 | 11/1979 | (GB) . |

* cited by examiner

Primary Examiner—James R. Brittain
Assistant Examiner—John L. Beres
(74) Attorney, Agent, or Firm—W. Warren Taltavull; Manelli Denison & Selter PLLC

(57) ABSTRACT

A seal for effecting a seal between two components (2,4) to inhibit a flow of fluid, between the two components, in a sealing direction (22) from an upstream side (24) of the seal to a downstream side (26) of the seal. The downstream side (26) of the seal in use being at a lower pressure than the upstream side (26) of the seal. The seal comprising a carrier (12) adapted for mounting from one of the components (4), and a plurality of densely packed resilient strips (6) mounted on the carrier (12) to extend therefrom. Each strip (6) having a tip (20) which is adapted to wipe on the other component (2) to effect a seal thereagainst in the sealing direction (22) with the strips (6) arranged substantially parallel to the sealing direction (22). The seal being characterized in that there is provided a gap (30) between adjacent strips to allow the tip portions (20) of the strips (6) to move relative to each other and maintain in use a flexible seal. In order to provide the gap between strips the strips can be tapered, bent, or curved. Alternatively a spacer strip 7 may provided between strips 6.

19 Claims, 5 Drawing Sheets

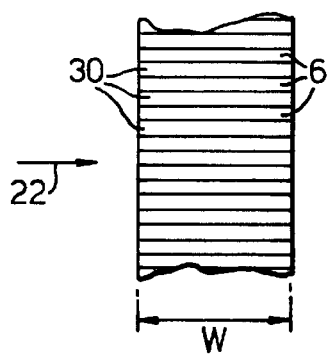
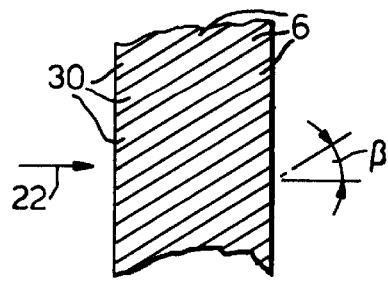
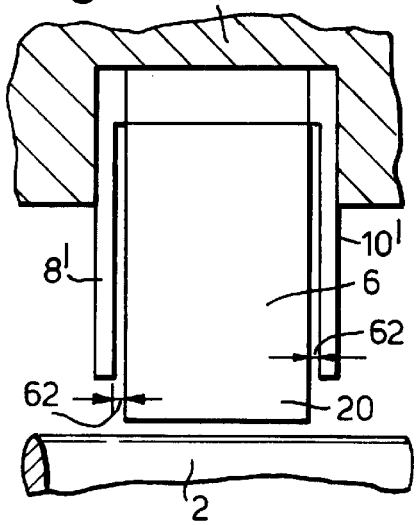
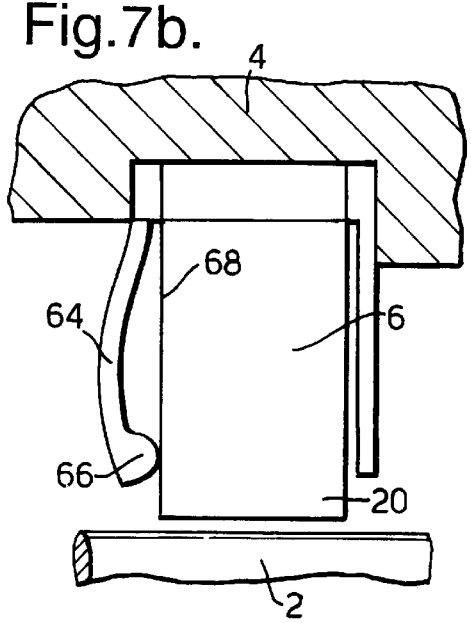
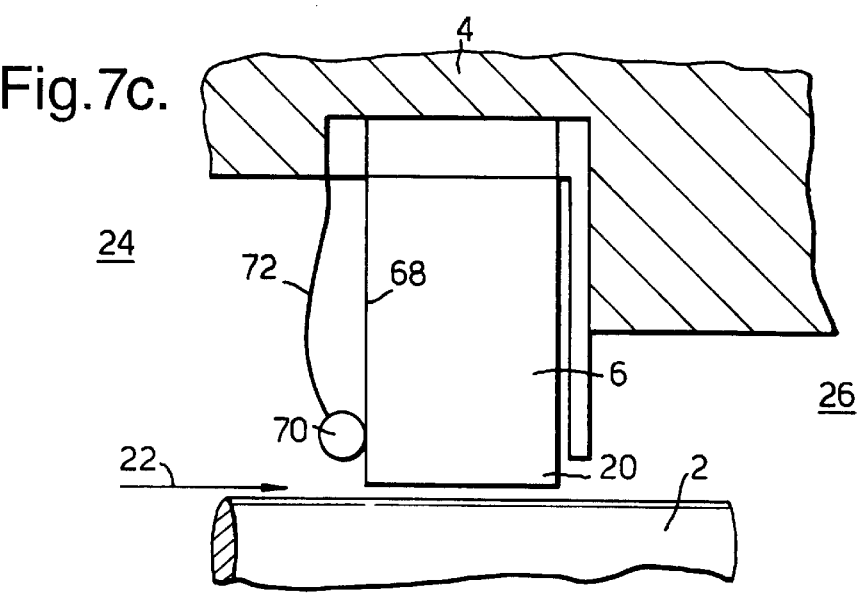

RESILIENT STRIP SEAL ARRANGEMENT

THE FIELD OF THE INVENTION

The present invention relates generally to a seal arrangement and in particular to improvements to leaf seals.

BACKGROUND OF THE INVENTION

It is frequently necessary to effect a seal in a clearance gap between two components that are capable of relative movement. In particular seals are often required to seal between a rotatable shaft and a housing surrounding the shaft, the housing having a bore through which the shaft extends.

Within a gas turbine engine there are shafts that rotate at relatively high speeds and are exposed to pressurised hot gases. Seals are required for these shafts and the seal performance can have a significant effect on the overall efficiency of the gas turbine engine. There are a number of seal designs that have been proposed for such purposes and that are designed to operate within the harsh environment found within a gas turbine engine.

One type of seal that has been developed for shafts that rotate at relatively high speeds, as found in gas turbine engines, is a brush seal. In such a brush seal, a plurality of fine bristles (such as bronze or stainless steel wire) are held in a carrier mounted on a housing. The tips of the bristles wipe against the shaft so as to effect a seal thereagainst.

A problem with such brush seals is that in use the bristles tend to flex in an axial, sealing direction, away from the high pressure side of the seal towards the low pressure side. Bending of the bristles in this way reduces the effective radial length of the bristles and so reduces the contact between the bristle tips and the shaft. In turn this reduces the sealing efficiency. Additionally flexing of the bristles can clamp the bristles against each other and against a backing member of the seal. Friction between the bristles and the backing member stiffens the bristles and prevents free movement of the bristles so that they no longer follow the shaft. Excursions of the rotating shaft are therefore not accommodated by the bristles. This leads to clearance gaps opening up between the bristle tips and shaft, and at the other extreme increased wear of the bristles, both of which reduce the seal performance.

An alternative type of seal that has been proposed for gas turbine engines, and also other applications, is a leaf seal. Leaf seals, which are sometimes called foil seals, comprise a number of thin resilient yet flexible strips which are densely packed together with the strips substantially aligned in the sealing direction. One end of the strips is held within a housing whilst the other, distil end of the strip extends across the seal gap and rests on the shaft. Such a seal design is described in European Patent Application EP 0,391,676. As described the seal elements, comprising the resilient strips in this type of seal are axially stiff and do not tend to bend in the axial, sealing, direction. This type of seal thereby alleviates some of the problems described above in relation to brush seals.

In EP 0,391,676 the resilient strips are described as being packed essentially solidly. This will prevent or restrict the radial movement of the strips. Consequently the seal described is also stiff in a radial direction. Problems can therefore occur during radial excursions of the shaft into the strips. The radial stiffness of the seal reacts against the radial movement of the shaft, causing high tip loads and increased wear of the strips.

It is therefore desirable to provide an improved seal design that alleviates the above problems and/or offers improvements generally.

SUMMARY OF THE INVENTION

According to the present invention there is provided a seal arrangement for effecting a seal between two components to inhibit a flow of fluid, between the two components, in a sealing direction from an upstream side of the seal to a downstream side of the seal, the downstream side of the seal arranged in use to be at a lower pressure than the upstream side of the seal, the seal comprising a carrier adapted for mounting from one of the components, and a plurality of densely packed resilient strips mounted on the carrier to extend therefrom, each strip having a tip which is adapted to wipe on the other component to effect a seal thereagainst in the sealing direction, the strips arranged substantially parallel to the sealing direction, characterised in that there is provided a gap between adjacent strips, at least at the tip portions of the strips, to allow the tip portions of the strips to move relative to each other and so maintain in operation a flexible seal.

By providing a small discrete gap between the individual strips of the seal at the point where the strips touch the shaft the strips can move relative to each other. A degree of radial movement of the shaft into the seal can thereby be accommodated by movement of the strips without the seal becoming effectively solid.

The seal is also straightforward to manufacture and is relatively cheap to produce.

Preferably one component is a rotatable shaft and the other component is a stationary housing.

Preferably the strips are tapered such that the thickness at the tip of each strip which is arranged to wipe against the other component is less than the thickness at the end portion of the strips that is mounted on the carrier.

Furthermore along the length of each strip, toward its tip, there may be a step change reduction in the thickness of the strip. The thickness of each strip may preferably be reduced in a series of steps along the length of the strip towards its tip.

A spacer strip may be interposed between adjacent strips there may be provided a spacer strip, the spacer strip extends from the carrier and is of a shorter length than the strips thereby providing a gap between the tips of the strips.

Preferably when viewed in the sealing direction the strips extend from the carrier at an angle to a direction perpendicular to the carrier.

The strip may be bent part way along its length such that the strip is divided into two portions, a first portion that is mounted on and extends from the carrier, and a second portion which extends from the first portion and is arranged to wipe against the other component, the second portion extending at an angle to the first portion. Furthermore the strips may be bent at a plurality of positions along their length such that the strips are divided into a plurality of portions, each portion extending at a different angle to the other portion of the strip. The strips may be curved in the direction of the length of the strips extending from the carrier to the tips of the strips that are arranged to wipe against the other component.

Bending, or curving the individual strips of the seal provides an improved method of ensuring that there is a gap between individual strips whilst allowing the strips to abut each other at the other end. By abutting the seal at one end, where a gap between strips is not needed, the overall leakage through the seal is reduced. Bending of the strips to control the gap between strips is also simpler to manufacture than radially tapering the thickness of the strips. The individual strips, since they abut at one end, can also be simply and easily assembled and fixed in position by welding or other means.

Preferably the strips are mounted with the width of the strips at an angle to the sealing direction of the seal.

The seal may be provided with a damper which acts on the strips to damp relative movement of the tips of the strips which are arranged to wipe against the other component. Preferably the damper comprises a front skirt and back skirt which extend from the carrier on opposite sides of the strips, the front and back skirts are separated from the edges of the strips by a gap and enclose a substantial portion of the strips therebetween such that, in use, viscous damping of the strips is produced. The damper may comprise at least one finger member that extends from the carrier, the tip of the finger member touches and is urged against one of the edges of a plurality of the strips part way along the length of the strips. The damper may comprise a damping member which is suspended from the carrier by a plurality of wires and rests against one edge of a plurality of the strips part way along the length of the strips, the damping member adapted in use to be urged against the edge of the strips by a leakage flow though the seal.

Furthermore the seal may also comprise a second plurality of densely packed resilient strips arranged substantially parallel to the sealing direction and mounted on the carrier to extend therefrom, with the tips of each strip adapted to wipe on the other component to effect a further seal thereagainst, the second plurality of strips mounted, in a sealing direction, in flow series relationship with the first plurality of strips.

The second plurality of strips may be arranged such that when viewed in a sealing direction the gaps between adjacent strips are substantially obscured by the strips of the second plurality of strips.

Preferably the gap between adjacent strips is less than 20% the thickness of the individual strips.

Preferably the seal is adapted for use in a gas turbine engine.

BRIEF DESCRIPTION OF DRAWINGS

The present invention will now be described by way of example with reference to the following figures in which:

FIG. 6a and b are views on arrow A shown in FIG. 1 of further alternative embodiments of the seal;

FIGS. 7a,b,c show further sections through further embodiments of seals incorporating the invention;

DETAILED DESCRIPTION OF THE INVENTION

Figure 1:
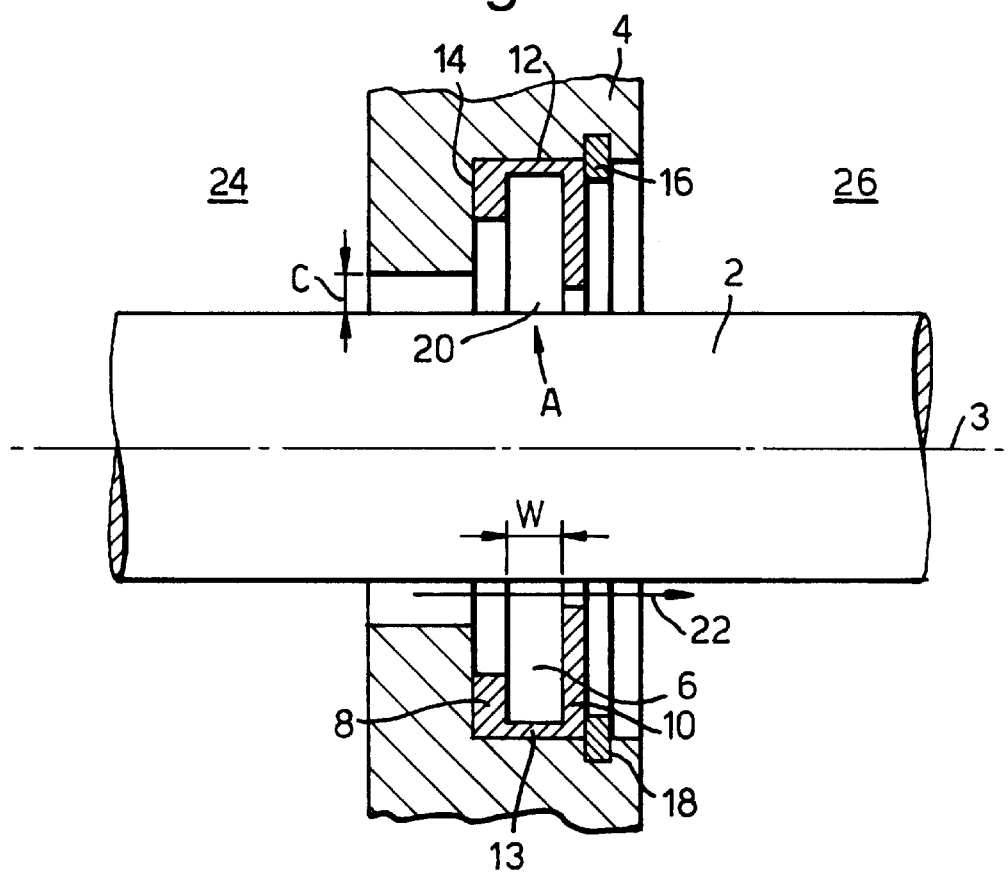
FIG. 1 is a vertical section through a seal assembly utilising a seal according to the present invention.

FIG. 1 shows a seal assembly for sealing a clearance gap C between a shaft 2, rotating about an axis 3, and a stationary housing 4, such as may be found in, for example, a gas turbine engine. The seal assembly prevents or restricts a flow of fluid, for example high pressure air, in a sealing direction (shown by arrow 22) from a region 24 of relatively high pressure to a region 26 of lower pressure. The shaft 2 rotates within a inner bore in a housing 4 through which the shaft 2 extends. The seal assembly comprises a plurality of relatively thin resilient seal strips 6 which are sandwiched between a carrier 13 comprising an annular front plate 8 and an annular backplate 10. The strips 6, front plate 8 and backplate 10 may all welded together around an outer circumference to form a seal unit 12. Alternatively they can be retained together by other means. The seal unit 12 is mounted within a counter bore 14, in the housing 4, by a circlip 16 which is sprung into a groove 18 within the housing 4. It will be appreciated though that the seal unit could be retained by other means which may also be incorporated with the means for retaining the front plate 8, backplate 10, and strips 6 together as a seal unit 12.

Figure 2:
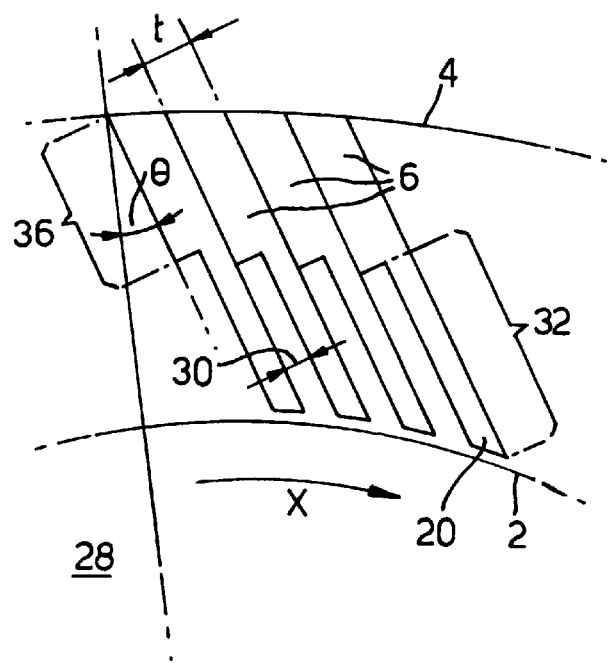
FIG. 2 is a part axial end view of the strips of the seal shown in FIG. 1.

The seal strips 6 are densely packed around the circumference of the shaft 2 and extend in a generally radial direction such that their free distil ends 20 wipe against the outer circumference of the shaft 2, as is shown in FIG. 2. As will be appreciated from FIG. 2 the strips 6 extend at an angle θ to the true radial direction 28 of the seal such that they trail the direction of rotation (shown by arrow X) of the shaft 2. Typically an angle θ between 20° and 70° is used. However they can extend radially (i.e. at an angle of 0°) or at any other angle. The seal strips 6 are arranged edge on within the seal assembly such that the width W of the strip 6 lies generally in the sealing direction 22. As shown in FIG. 1 the sealing direction 22 in the embodiment shown is generally parallel to the axis 3 of the shaft 2 and seal. The width W of the strip 6 is greater than the thickness t of the strip 6 in order to provide adequate stiffness in the sealing (axial) direction 22. Consequently the strips 6 exhibit a high degree of resistance to bending in the seal direction 22 alleviating some of the problems found in brush seals caused by bending of the bristles against the backing members.

The thickness t of the strips 6 is similar to the bristle diameter in a brush seal. Typically this about 0.5 mm. The strips 6 are also made from similar materials as are used to make the bristles in brush seals. Typically the strips 6 are made from stainless steel or other high temperature materials such as for example Haynes 25, INCO 718 or Nimonic.

As shown in FIG. 6a each strip 6 is essentially flat and planar and lies with its plane parallel to the sealing direction 22. However each strip 6 could lie with its plane at an angle β to the sealing direction 22 as shown in FIG. 6b. Yet another possibility is for each strip 6 to be curved across its width W, although this is not shown.

As described above the seal is generally similar to the seal described in EP 0,391,676. However as shown in FIG. 2 at the point where the strips 6 wipe against the shaft 2 the strips 6 are separated from each other by a small discrete gap 30. This gap allows a degree of circumferential movement and bending of the strips 6 before they abut each other and produce an effectively solid seal. The seal is therefore compliant and resilient in a radial direction whilst being relatively stiff in a sealing (axial) direction 22. Circumferential movement of the strips 6 reduces the effective radial length thereof and moves the tip 20 of the strip 6 radially outwards. Consequently by circumferential bending of the strips 6 the seal can accommodate a degree of relative radial movement of the shaft 2 without becoming effectively solid. This can be contrasted with the seal described in EP 0,391,676 where the strips are packed essentially solidly and there are no interstices between adjacent strips, resulting a radially stiff seal that cannot accommodate relative radial movement of the shaft without considerable tip loads and wear of the strips.

Radial movement of the shaft 2 relative to the housing 4 and the seal can occur in particular when such seals are used within gas turbine engines. The relative movement of the shaft 2 can be caused by a number of factors including for example thermal growth of the shaft 2, slight eccentricities in mounting and aligning of the shaft 2 relative to the housing 4 causing the shaft 2 to orbit, and uneven transient loading of the shaft 2.

The gap 30 between adjacent strips 6 is sized to accommodate the expected relative radial movement of the shaft 2 such that the strips 6 are free to move circumferentially, in response to the expected radial movement of the shaft 2, without the tips 20 of the strips 6 which wipe against the shaft 2 abutting each other. However to minimise leakage through these inter strip gaps 30 it is important that the inter strip gaps are not excessive, or greater than the minimum required. Typically for use in gas turbine engines the size of the gap 30 is approximately less than 20% of the thickness t of the strips 6.

Figure 3:
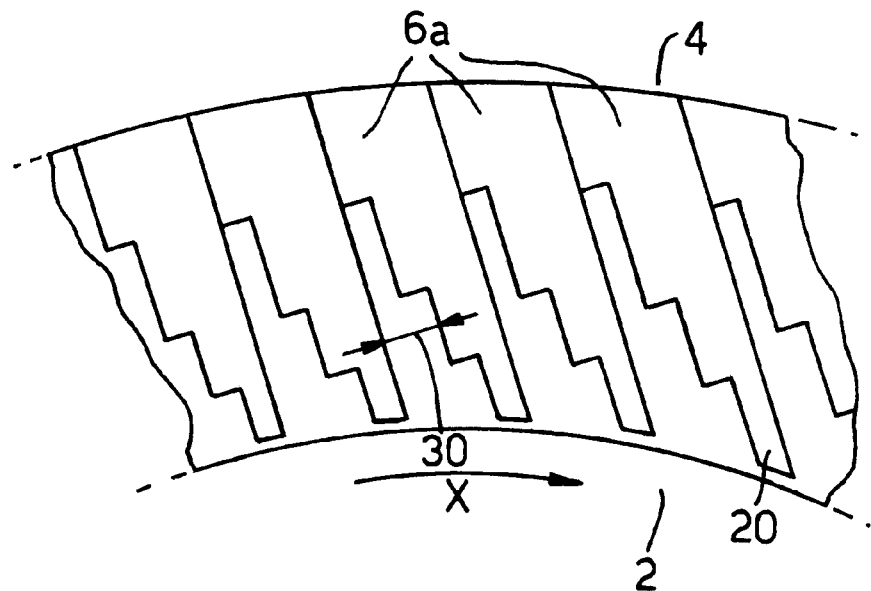
FIG. 3 is view similar to that shown in FIG. 2 but of a alternative embodiment of the seal.

The required gap 30 between adjacent strips 6 can be provided by a number of alternative arrangements. As shown in FIG. 2 the gap 30 between the tips 20 of adjacent strips 6 is achieved by reducing the thickness t of the radially inner ends 32 of the strips 6. The thickness t of the strips 6 being reduced by for example etching the end portions 32 of the strips 6 in a suitable etchant to remove a portion of material from the end portion 32 of the strip 6. The thickness t of the strip 6 could however be reduced gradually in stages as shown in FIG. 3. A yet further possibility (not shown) is to gradually taper the strip 6 in a radial direction.

Figure 4:
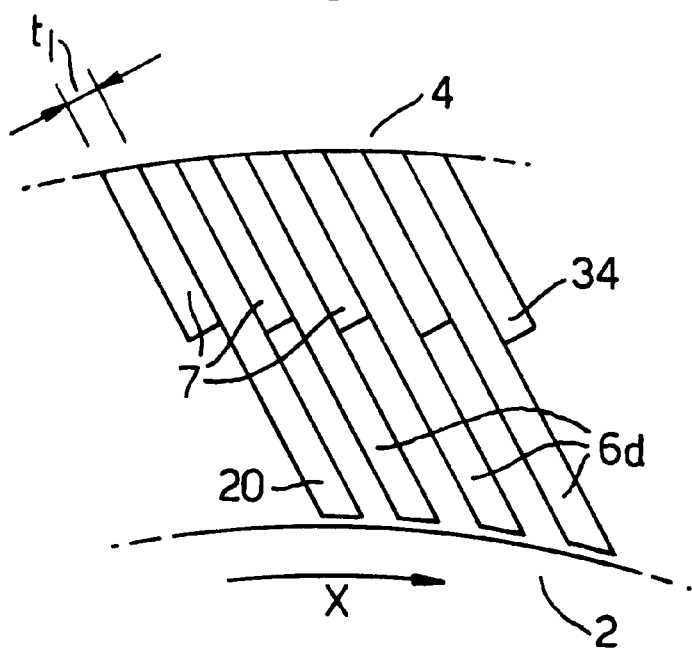
FIG. 4 is a further view similar to that shown in FIG. 2 of a further embodiment of the seal.

Another arrangement for providing a gap 30 between adjacent strips 6 is shown in FIG. 4. In this arrangement individual strips 6d of a substantially constant thickness are separated from each other by spacing strips 7. The spacing strips 7 are of a shorter radial length and extend from the housing 4. The free ends of the spacing strips end radially part way along the length of the strips 6d. Successive strips 6d are therefore separated from each other by the thickness $t_1$ of the spacing strips 7, thereby providing a gap 30 between the tips 20 of the strips 6d. Although only one spacing strip 7 has been shown in FIG. 4 it will be appreciated that multiple spacing strips 7 of varying radial length could be used between successive seal strips 6d. The effective gap 30 provided between the strips 6d being similar to that shown in FIG. 3.

In the above described arrangements the radially outer portions 36 of the strips 6, which are attached to the housing via the front plate 8 and backplate 10, abut circumferentially. The outer portions 36 of the strips 6 are therefore densely packed, essentially solidly in this radially outer region. This ensures that the strips 6 are aligned and positioned within the seal. It also simplifies the manufacture of the seal allowing the strips 6 to be easily welded together. Furthermore since there is no gap between the outer portions 36 of the strips 6 in this region, leakage through the seal, between the strips 6 is reduced.

It will be appreciated that at the outer radius of the seal the circumference is greater than the circumference of the shaft 2. Consequently since the strips 6 extend radially the tapering of the strips 6 required to produce a gap 30 at the tips 20 of the strips 6 should take into account the reduction in circumferential space available between the outer and inner radii. If the tapering is not sufficient then any gap 30 between strips 6 would tend to close up and reduce towards the radially inner end. It being essential according to the invention that a sufficient gap 30 is provided at the tips 20 of the strips 6. Preferably the tapering should be such that the gap 30 increases towards the tip 20 of the strips 6, as shown in FIG. 3. The most space being required at the tips 20 of the strips 6 to allow a given degree of circumferential movement of the strips 6.

Figure 5A:
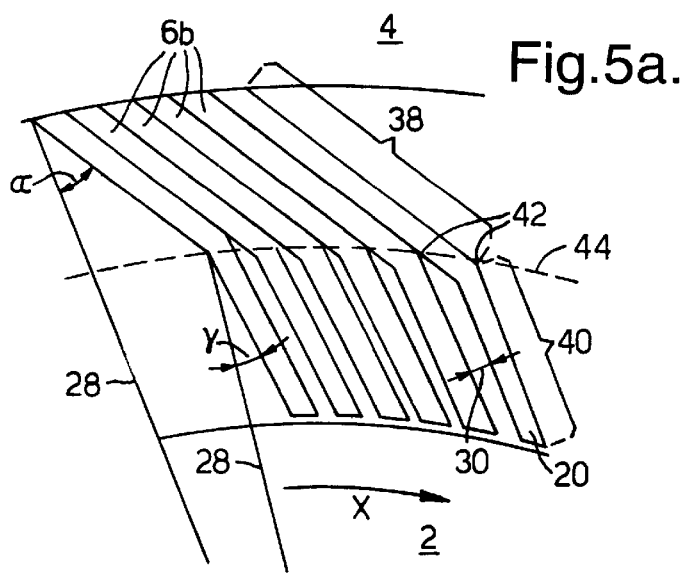
FIGS. 5a, 5b, and 5c care views similar to that of FIG. 2 but on further alternative embodiment of the seal.

A further embodiment is shown in FIG. 5a. The seal is generally similar to the above described seals except that the plurality of radially extending strips 6b which comprise the seal are bent part way along their radial length. The general arrangement of this seal will therefore not be described further. The bent strips 6b extend from the carrier 13 and housing 4 such that a first portion 38 of the strip is at a first angle α to the true radius 28 of the seal, whilst a second portion 40 of the strip 6b is at a second angle γ to the true radius 28 of the seal. The first portion 38 of the strips 6b abut each other and ensure that the strips 6b are correctly aligned and allow simple assembly of the seal. This is similar to the way that the radially outer portions 36 of the tapered strips 6 are arranged. The strips 6b are arranged within the seal such that the point of inflection 42 of each of the strips 6b lies on a circle concentric 44 with the seal. By this arrangement the point of inflection 42 of each strip 6b is overlapped by the first portion 38 of an adjacent strip 6b thereby providing a small discrete gap 30 between successive strips 6b.

Figure 5B:
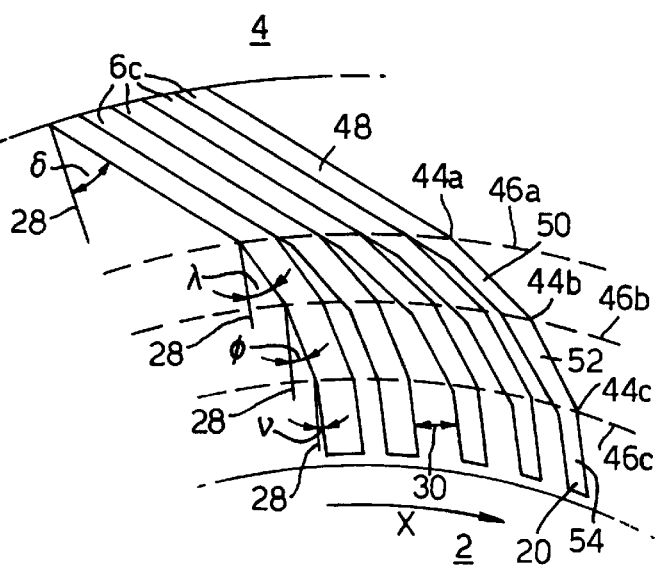

A variation on the arrangement shown in FIG. 5a is shown in FIG. 5b. In this arrangement each of the individual strips 6c making up the seal is bent at a number of inflection points 44a,44b,44c along its length to produce a multi-bend strip 6c. These multi-bend strips 6c are assembled in a similar way to the single bend strip 6b arrangement described above, such that the points of inflection 44a,44b,44c of the strips 6c lie on a series of concentric circles 46a,46b,46c about the seal, with each adjacent strip 6c slightly overlapping each point of inflection 44a,44b,44c of a previous strip 6c. Different portions 48,50,52,54 of the strips 6c extend from the housing at different angles δ,λ,φ,ν to the true radius 28 of the seal. A small discrete gap 30 between successive strips 6c is thereby provided allowing the tips 20 of the strips 6c to move circumferentially to accommodate any radial movement of the shaft 2 into the seal.

An advantage of this multi-bend arrangement is that the gap 30 between the strips 6c can be more accurately controlled and varied along the length of the strip 6c. The size of the gap 30 and its variation along the length of the strips 6c being determined by the number of bends 44a,44b,44c in the strips 6c and the bend angle δ,λ,φ,ν. The gap 30 can therefore be minimised along the length of the strips 6c, reducing leakage through the seal whilst still providing sufficient space, particularly at the tip 20, for the strips 6c to move. It will be appreciated that the size of the gap 30 required to allow the strips 6c to move the required degree varies along the length of the strips 6c. A larger gap 30 being required between the radially inner ends of the strips 6c than is required at the radially outer ends to allow the same degree of movement of the strips 6c.

Figure 5C:
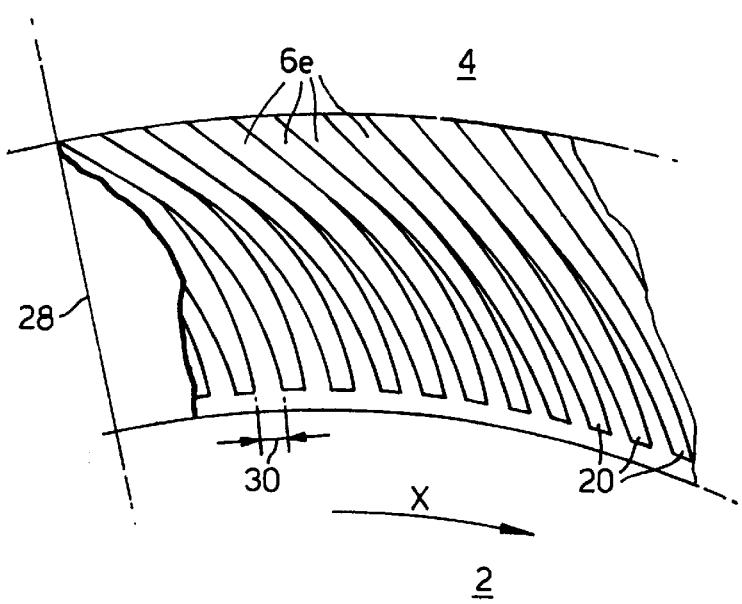

It will be appreciated that the multi-bend arrangement can be further developed and improved by using radially curved strips of for example circular, ellipsoid or parabolic shape as shown in FIG. 5c. The exact shape of the strips being determined by the shape and size of the gap required to allow the desired movement of the strips. The use of such curved strips allows even greater control of the size of the gap between strips over the length of the strip. Leakage through the seal can therefore be further minimised.

Figure 8:
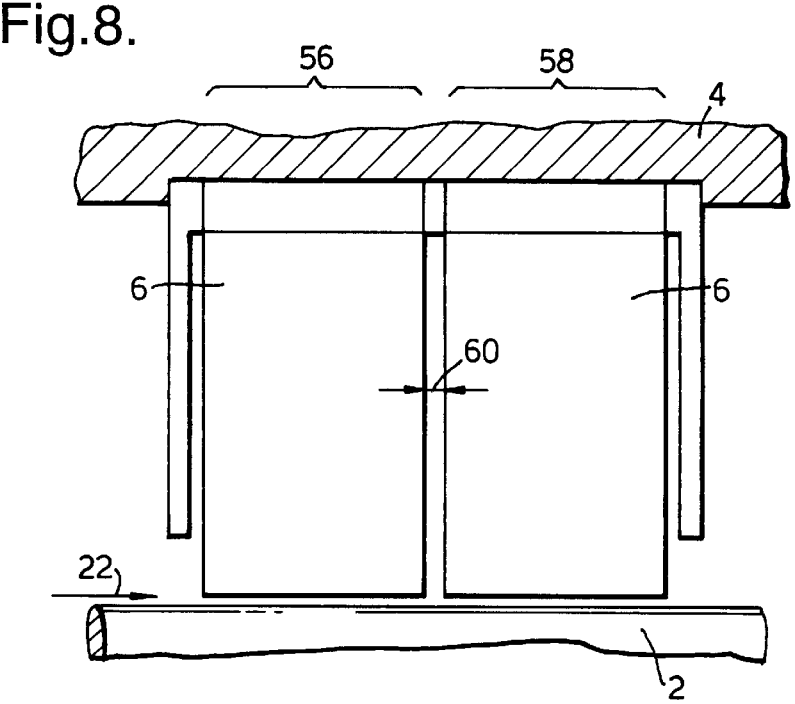
FIG. 8 shows a section through a compound seal assembly incorporating seal elements according to the present invention.
Figure 8A:
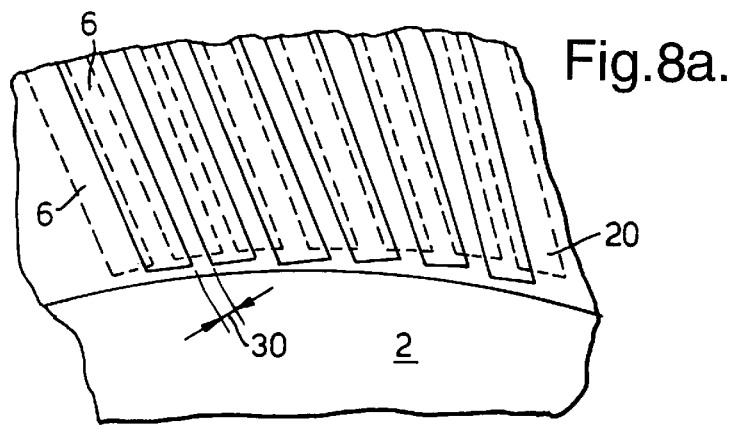
FIG. 8a is a more detailed end view of part of the seal assembly shown in FIG. 9 illustrating the arrangement of the strips.

The above described seals have a leakage flow rate that is dictated by the inter strip gap 30. To reduce this leakage flow rate without altering the inter strip gap 30 two seal elements 56,58 can be used in tandem, one behind the other, in the sealing direction 22 as shown in FIG. 8. Each of the two seal elements 56,58 comprises a similar arrangement of radially extending strips 6 which circumferentially surround the shaft 2. The downstream seal element 58 is separated from the upstream seal element 56 by a small clearance 60. The strips 6 in each element 56,58 are therefore free to move independently. The downstream element 58 is also rotated a small degree such that the seal strips 6 of the downstream seal element 58 overlap the gap 30 between adjacent strips 6 of the upstream seal element 56 when viewed in the sealing (in this embodiment axial) direction 22. This is shown in FIG. 9a where the phantom lines indicate the position of the strips 6 of the downstream seal element 58. By this arrangement the leakage flow, in the sealing direction 22, through the inter strip gaps 30 of the upstream seal element 56 is blocked, or at least impaired, by the strips 6 of the downstream seal element 58. This results in a reduced leakage flow through the compound seal and therefore improved seal performance.

Since according to the invention the strips 6,6a,6b,6c,6d are separated from each other by a discrete gap 30 they are free to move. This can give rise to, or exacerbate, vibration or flutter of the strips 6,6a,6b,6c,6d. Such vibration or flutter is undesirable since it can over time cause damage to the strips 6,6a,6b,6c,6d. Consequently it may be necessary to provide the seal with means to damp or reduce the vibration or flutter of the strips 6,6a,6b,6c,6d.

Referring to FIG. 7a one method is to configure the front 8' and back plate 10' of the seal such that they extend over the majority of the radial length of the strips 6. The front 8' and back plate 10' are spaced from the strips 6 by only a small gap 62. The front 8' and back plate 10' thereby form skirts which enclose a significant part of the strips 6 allowing viscous effects of the narrow inter strip gaps 30 to dampen any vibration or flutter.

Extended front 8' and back 10' plates, which extend to near the other component 2, also improve the seal performance since the plates 8', 10' provide a physical barrier to the leakage flow, further restricting leakage through the seal. In addition the plates 8', 10' also help prevent dirt or other material from being entrained into the seal and possibly clogging the inter strip gaps 30. For these reasons such extended front and back plates 8', 10' may accordingly be used in other embodiments of the invention.

If further damping is required then a split skirt damper (FIG. 7b) or ring damper (FIG. 7c) arrangement can be used. A split skirt damper, as shown in FIG. 7b, comprises a number of radially extending fingers 64 which are sprung such that the distil end 66 of the each finger 64 abuts and presses against the upstream front edge 68 of a number of the seal strips 6 of the seal. The friction between the end of the fingers 66 and the edges of the strips 68 will tend to damp the vibration and flutter of the strips 6. The fingers 64 also tend to partially link the strips 6 together since the fingers 64 contact a number of adjacent strips 6.

A ring damper is shown in FIG. 7b and comprises a ring 70 which is loosely mounted concentrically with the shaft 2 by a number of wires 72 such that it rests against the upstream edge 68 of the strips 6. The ring 70 is pressed against the edges 68 of the strips 6 by the leakage flow of fluid in the sealing direction 22 and the pressure differential, between the upstream pressure 24 and downstream pressure 26, across the seal. It thereby damps any vibration in a similar way to the split skirt damper.

Figure 9:
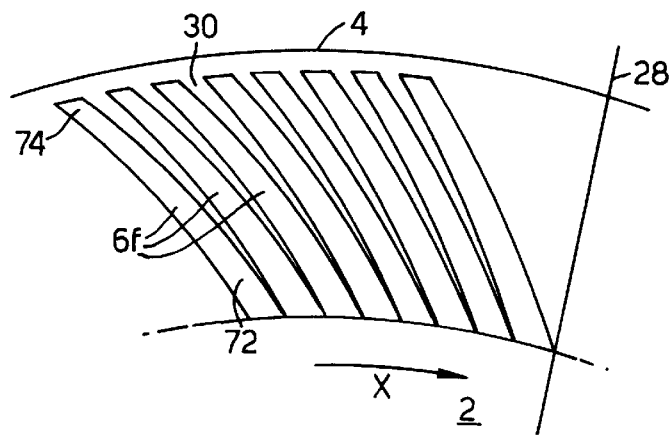
FIG. 9 is a view similar to that of FIGS. 5a,5b,5c but of a outward facing embodiment of the seal.

Although the seal arrangement has been described in the above embodiments for sealing a clearance C between a rotating shaft 2 and a housing 4 it will be appreciated that the concept can be applied more generally. Indeed the invention can be applied to linear seals. The strips 6f may also be attached to the rotating component 2 rather than the stationary component 4 such that the strips 6f rotate. The strips 6f can also be arranged to be outward facing, as shown in FIG. 9, such that they are fixed at their radially inner ends 72 with the radially outer ends 74 of the strips 6f wiping against the other component 4. As with the radially inwardly facing arrangement the curved strips 6f produce an inter strip gap 30 at their free distil ends 74. It will also be appreciated that the other arrangements, for example bent or tapered strips 6 described and shown in the other figures, could be used to produce an inter strip gap 30 between the free ends 74 of the strips in an outward facing configuration. In these arrangements though the free ends 74 of the strips 6f, and inter strip gaps 30, are at the radially outer ends 74 of the strips 6f.

I claim:

1. A seal for effecting a seal between two components, the seal having a upstream side, a downstream side and a sealing direction defined as from said upstream side to said downstream side, the downstream side arranged in use to be at a lower pressure then said upstream side of said seal, in use a flow of a fluid in said sealing direction being inhibited by the seal, the seal comprising a carrier adapted for mounting from one of said components, and a plurality of densely packed resilient strips, the strips arranged substantially parallel to the sealing direction and being mounted on said carrier and extending therefrom, each strip having a tip portion which is bendable and resiliently flexible to maintain wiping contact with the other component to effect in a sealing direction a seal there against, wherein a gap is provided at least at the tip portion between adjacent strips, said gap arranged to allow the tip portion of the strips to move relative to each other and in operation still maintain a flexible seal.

2. The invention is claimed in claim 1 wherein said seal is used in combination with a rotatable shaft which is one of the components and a stationary housing which constitutes the other of said components.

3. A seal as claimed in claim 1 in which the strips are tapered such that the thickness at the tip portion of each strip which is arranged to wipe against the other component is less than the thickness at the end portion of the strip that is mounted on the carrier.

4. A seal as claimed in claim 1 in which when viewed in the sealing direction the strips extend from the carrier at an angle to a direction perpendicular to the carrier.

5. A seal as claimed in claim 1 in which the strips are bent part way along their length such that the strips are divided into two portions, a first portion that is mounted on and extends from the carrier, and a second portion which extends from said first portion and is arranged to wipe against the other component, the second portion extending at an angle to the first portion.

6. A seal as claimed in claim 1 in which the strips are curved in the direction of the length of the strips extending from the carrier to the tips of the strips that are arranged to wipe against the other component.

7. A seal as claimed in claim 1 in which the strips are mounted with the width of the strips at an angle to the sealing direction of the seal.

8. A seal as claimed in claim 1 in which there is provided a damper, the damper acts on the strips to damp relative movement of the tips of the strips which are arranged to wipe against the other component.

9. A seal as claimed in claim 8 in which the damper comprises a front skirt and a back skirt which extend from the carrier on opposite sides of the strips, the front and back skirts are separated from the edges of the strips by a gap and enclose a substantial portion of the strips therebetween such that, in use, viscous damping of the strips is produced.

10. A seal as claimed in claim 8 in which the damper comprises at least one finger member that extends from the carrier, the tip of the finger member touches and is urged against one of the edges of the plurality of the strips part way along the length of the strips.

11. A seal as claimed in claim 8 in which the damper comprises a damping member which is suspended from the carrier by a plurality of wires and rests against one edge of the plurality of the strips part way along the length of the strips, the damping member adapted in use to be urged against the edge of the strips by a leakage flow though the seal.

12. A seal as claimed in claim 1 in which there is a second plurality of densely packed resilient strips arranged substantially parallel to the sealing direction and mounted on the carrier to extend therefrom, with the tips of each strip of the said second plurality of densely packed resilient strips adapted to wipe on the other component to effect a further seal thereagainst, the second plurality of strips mounted, in a sealing direction, in flow series relationship with the first plurality of strips.

13. A seal as claimed in claim 12 in which the second plurality of strips are arranged such that when viewed in a sealing direction the gaps between adjacent strips are substantially obscured by the strips of the second plurality of strips.

14. A seal as claimed in any preceding claim in which the gap between adjacent strips is less than 20% the thickness of the individual strips.

15. A seal as claimed in claim 1 which is adapted for use in a gas turbine engine.

16. A seal for effecting a seal between two components, the seal having a upstream side, a downstream side and a sealing direction defined as from said upstream side to said downstream side, the downstream side arranged in use to be at a lower pressure then said upstream side of said seal, in use a flow of a fluid in said sealing direction being inhibited by the seal, the seal comprising a carrier adapted for mounting from one of said components, and a plurality of densely packed resilient strips, the strips arranged substantially parallel to the sealing direction and being mounted on said carrier and extending therefrom, each strip having a tip portion which is bendable and resiliently flexible to maintain wiping contact with the other component to effect in a sealing direction a seal there against, wherein a gap is provided at least at the tip portion between adjacent strips, said gap arranged to allow the tip portion of the strips to move relative to each other and in operation still maintain a flexible seal, along the length of each strip, toward its tip, there being provided a step change reduction in the thickness of the strip.

17. A seal as claimed in claim 16 in which the thickness of each strip is reduced in a series of steps along the length of the strip towards its tip.

18. A seal for effecting a seal between two components, the seal having a upstream side, a downstream side and a sealing direction defined as from said upstream side to said downstream side, the downstream side arranged in use to be at a lower pressure then said upstream side of said seal, in use a flow of a fluid in said sealing direction being inhibited by the seal, the seal comprising a carrier adapted for mounting from one of said components, and a plurality of densely packed resilient strips, the strips arranged substantially parallel to the sealing direction and being mounted on said carrier and extending therefrom, each strip having a tip portion which is bendable and resiliently flexible to maintain wiping contact with the other component to effect in a sealing direction a seal there against, wherein a gap is provided at least at the tip portion between adjacent strips, said gap arranged to allow the tip portion of the strips to move relative to each other and in operation still maintain a flexible seal and a spacer strip being interposed between adjacent strips, the spacer strip extending from the carrier and being of shorter length than the strips thereby providing a gap between the tips of the strips.

19. A seal for effecting a seal between two components, the seal having a upstream side, a downstream side and a sealing direction defined as from said upstream side to said downstream side, the downstream side arranged in use to be at a lower pressure then said upstream side of said seal, in use a flow of a fluid in said sealing direction being inhibited by the seal, the seal comprising a carrier adapted for mounting from one of said components, and a plurality of densely packed resilient strips, the strips arranged substantially parallel to the sealing direction and being mounted on said carrier and extending therefrom, each strip having a tip portion which is bendable and resiliently flexible to maintain wiping contact with the other component to effect in a sealing direction a seal there against, wherein a gap is provided at least at the tip portion between adjacent strips, said gap arranged to allow the tip portion of the strips to move relative to each other and in operation still maintain a flexible seal, the strips being bent part way along their lengths such that each strip is divided into two portions, a first portion being mounted on and extending from the carrier, and a second portion which extends from said first portion and is arranged to wipe against the other component, the second portion extending at an angle to the first portion, the strips being bent at a plurality of positions along their lengths such that the strips are divided into a plurality of portions, each portion extending at a different angle to the other portions of the strip.

* * * * *